UNITED STATES PATENT OFFICE.

KOSAKU MURAKAMI, OF TOKYO, JAPAN.

METHOD OF PREPARATION OF ARTIFICIAL PEARLS AND JEWELRY.

1,289,873.  Specification of Letters Patent.  Patented Dec. 31, 1918.

No Drawing.  Application filed June 23, 1915.  Serial No. 35,953.

*To all whom it may concern:*

Be it known that I, KOSAKU MURAKAMI, of Tokyo, Japan, a Japanese subject, have invented certain new and useful Improvements in Methods of Preparation of Artificial Pearls and Jewelry, of which the following is a specification.

The object of my invention is to effect in a very efficient manner the manufacture of artificial pearls and jewelry from crystalline lenses of the eyes of fishes or sea animals, which are almost the same in appearance as genuine pearls and jewelry.

A further object of the invention is to produce artificial pearls and jewelry of ball shape without a special treatment for preparing them in shape of balls by using crystalline lenses of the eyes of fishes or sea animals, which are naturally of the shape of balls.

A further object of my invention is to solidify crystalline lenses of the eyes of fishes or sea animals by heating the same in presence of moisture, and also to remove the white gelatin layer on the surface of the central transparent crystalline lenses by treating the same under heat with an alkali solution.

A further object of my invention is to make solid transparent crystalline lenses treated with alkali solution as aforesaid, smooth and lustrous by washing the same with water and polishing with table salt or sodium sulfate.

A further object of my invention is to provide a process for storing the transparent crystalline lenses treated as aforesaid without breaking or cracking when exposed to the atmosphere until they are subjected to further treatment.

A further object of my invention is to change the crystalline lenses after treatment with alkali solution, and subsequently washing and polishing as aforesaid, into a firmer and stronger form of gelatin-formaldehyde.

A further object of my invention is to make the transparent crystalline lenses, semi-transparent or non-transparent by the precipitation of insoluble metallic salt or salts within them.

A further object of my invention is to give pearl-like color to crystalline lenses by means of sulfid of lead and the white precipitates of insoluble lead salt produced within the crystalline lenses by suitable chemical treatment of the same.

A further object of my invention is to produce jewelry of different colors by macerating crystalline lenses, transparent, semi-transparent or non-transparent, in the solution of different coloring matters by macerating the transparent crystalline lenses in the solution of suitable metallic salt or salts dissolved with dyestuffs and then treating with suitable organic or inorganic acids.

A further object of my invention is to make the artificial pearls and jewelry prepared as aforesaid lustrous and more steady by coating the same with the admixture of collodion and ether both in equal quantities.

Further objects and features of my invention are hereinafter more particularly set forth in the following description and statement of claims.

My invention broadly relates to the process of preparing artificial pearls and jewelry from crystalline lenses of the eyes of fishes or sea animals by heating the same in presence of moisture to solidify them, by removing white gelatinous layer on the surface of the central transparent crystalline lenses, by allowing insoluble metallic salt or salts to precipitate within the transparent crystalline lenses by chemical treatment of the same, and also by giving pearl-like or other different colors with or without use of dyestuffs. Although different examples of methods to carry out my invention are given in the following description, my invention is not confined to these examples. Of course there may be different alternative methods in the practical treatment without diverting from the spirit of my invention.

Crystalline lenses of the eyes of fishes or sea animals consist of gelatinous substance and they have heretofore been only utilized for manufacturing glue or gelatin. I am not aware of any process of manufacturing artificial pearls or jewelry from the crystalline lenses by utilizing their constituents, the gelatinous substance having naturally the shape of balls. The feature of my invention is that artificial pearls and jewelry are manufactured without special treatment for making the same into the shape of balls, by utilizing their natural shapes and also by utilizing their easy permeability by solution of any different metallic salts and acids by simply macerating therein for a long while, or in a short time under heating at a moderate temperature.

In the following, I describe various processes for preparing and manufacturing artificial pearls and jewelry according to my invention.

I. *Treatment for preparing transparent crystalline lenses.*—Crystalline lenses of eyes of fishes or sea animals are heated with moisture, that is, boiled in water until the crystalline lenses become solid with a coat of white layer of a gelatinous substance, and then the same is treated with alkali solution, for instance, with caustic soda solution of 3° to 6° Baumé until the white layer of gelatinous substance is removed and the central transparent crystalline lenses show themselves.

The transparent crystalline lenses obtained are well washed with water and then polished with table salt or sodium sulfate to make the same smooth and lustrous and in order to make the same more steady and prevent them from breaking, the crystalline lenses may, if desired, be treated with formalin for a long while or in a short time under heating at a moderate temperature.

Crystalline lenses treated with alkali solution and polished with table salt or sodium sulfate are often apt to easily break when they are allowed to dry in exposure to the atmosphere, and for the purpose of storing them without any damage until they are subjected to further treatment, they may be coated with liquid paraffin, arabic gum or any other suitable paste.

The gelatinous substance removed from the crystalline lenses by the treatment with alkali solution can be collected and if the same is well washed with water or treated with any suitable acid to neutralize the alkali mixed therein, pure glue can be obtained and the same is useful for various industrial purposes.

II. *Process for making the transparent crystalline lenses semi-transparent or non-transparent and for coloring.*—In order to make the transparent crystalline lenses prepared as aforesaid, semi-transparent or non-transparent, it is only necessary to allow insoluble metallic salt or salts to precipitate within them. For this purpose, the transparent crystalline lenses are at first macerated in the solution of any such suitable metallic salt or salts as will produce insoluble metallic salt or salts by chemical reaction when they meet with any suitable organic or inorganic acid, and when the soluble metallic salt or salts are thoroughly permeated in the crystalline lenses, the same is treated with a suitable acid. These treatments result in precipitation of insoluble metallic salt or salts within the crystalline lenses. The longer the duration of treatment, the more the precipitation of insoluble metallic salt or salts, and at last the crystalline lenses become non-transparent.

For this purpose any metallic salt and corresponding precipitant may be used so far as they are consistent with my invention and, therefore, they can not be all enumerated herein.

As to the process of coloring crystalline lenses, they can be dyed with any suitable dyestuffs and sometimes a special color can be given thereto only by means of insoluble metallic salt or salts precipitated therein and without using any dyestuffs. Even in case where dyestuffs are used, crystalline lenses can be dyed while they are still transparent, or they can be dyed after they have been treated to be semi-transparent or non-transparent and also they can be dyed in the process of treating with the solution of metallic salt or salts and before they are treated with an acid or carbonate of soda.

The treatment in these processes is to be modified in each case and all practical methods cannot be enumerated herein. In the following description a few examples of the practical methods are given, but my invention is not confined precisely to these examples.

Example I. Transparent crystalline lenses are macerated for about twenty-four hours in the five per cent. solution of lead acetate and the whole is heated at a moderate temperature, for instance, 40° centigrade. By this treatment, the crystalline lenses become a little brown by means of lead sulfid produced therein by the combination of lead acetate with sulfur contained in the gelatin constituting the crystalline lenses.

The brown crystalline lenses thus obtained are washed with water and then treated with five per cent. solution of carbonate of soda for five to ten hours. Then carbonate of soda reacts on the lead acetate in the crystalline lenses and white precipitation of carbonate of lead is produced within them. The brownness of lead sulfid and whiteness of lead carbonate being combined produces pearl-like color in the crystalline lenses. Thus the artificial pearls of my invention are obtained.

Example II. Transparent crystalline lenses are macerated for five to fifteen hours in the five per cent. solution of lead acetate and after being washed with water, the same is treated with hydrochloric acid of 8° Baumé. By these treatments the lead sulfid and white precipitates of lead chlorid are produced within the crystalline lenses produce the same pearl-like color. Thus the artificial pearls of my invention are obtained.

In the Example II above mentioned, oxalic acid can be used in place of hydrochloric acid. In this case white precipitates of lead oxalate are produced. The compound which is used for precipitating metallic compound within the crystalline lenses of the eyes of fish or sea animals is called hereafter the precipitant. Sodium carbonate, hydrochloric acid, oxalic acid in the above examples are all precipitants of the solution of lead acetate.

Example III. Transparent crystalline lenses are macerated for five to ten hours in the five per cent. solution of barium hydroxid and after being washed with water, the same is treated with sulfuric acid of five per cent. In this case the sulfuric acid is a precipitant of barium hydroxid and the precipitate formed is barium sulfate.

Besides the examples above described, crystalline lenses can be treated by other different methods, for instance, by changing the soluble metallic salts or acids for the purpose of producing precipitates of different insoluble metallic salt or salts within them.

In case crystalline lenses are colored with dyestuffs, artificial jewels produced are of different colors according to the dyestuffs used. For instance, when dyestuffs such as rhodamin are used, artificial jewels red in color and similar to ruby are obtained. When the dyestuffs such as malachite green are used, green colored artificial jewels are obtained. In case dyestuffs such as fluorescence are used, blue colored artificial jewels are produced.

Crystalline lenses can be colored with various dyestuffs while they are transparent, and the colored crystalline lenses thus obtained can be treated with soluble metallic salts and their corresponding precipitants to have insoluble metallic salts precipitated therein. By such treatment of the crystalline lenses, the original colors of the same are somewhat modified by the precipitation of the insoluble metallic salts.

Although dyestuffs and methods of coloring should be modified according to each particular case, it is advisable to use the coloring matters of basic nature.

III. *Formaldehyde process.*—In order to make transparent crystalline lenses and artificial pearls and jewelry prepared by the above mentioned methods more steady, they are treated with formalin for a long while without heating or for a short time under heating at a moderate temperature to change the same into gelatin-formaldehyde, thereby making them more solid and substantial.

IV. *Finishing process.*—In order to make the artificial pearls and jewelry lustrous and steady, the same are coated with admixture of collodion and ether both in equal quantities.

Having now particularly described and ascertained the nature of my said invention and in what manner the same is to be performed, I declare what I claim is:—

1. The process of manufacturing artificial jewelry from the crystalline lenses of the eyes of sea animals comprising solidifying said lenses by heating the same with moisture and removing the white surface of the same by the treatment thereof of an alkali solution.

2. The process of manufacturing artificial jewelry from the crystalline lenses of the eyes of sea animals comprising solidifying said lenses by heating the same with moisture and removing the white surface of the same and coating the same with a preservative.

3. The process of manufacturing artificial jewelry from the crystalline lenses of the eyes of sea animals comprising solidifying said lenses by treating the same with heat and moisture and removing the white surface of the same and coating the same with paraffin.

4. The process of manufacturing artificial jewelry from the crystalline lenses of the eyes of sea animals comprising solidifying said lenses, then removing the white surface of the same, then macerating the same in a solution of a metallic compound, then treating the same with a solution of a precipitant which will form an insoluble compound with the metallic compound to make said lenses lose their transparency.

5. The process of manufacturing artificial jewelry from the crystalline lenses of the eyes of sea animals comprising solidifying said lenses, then removing the white surface of the same, then treating the same with a solution of lead acetate, and then treating the same with an acid which will form a "precipitate" with lead acetate.

6. The process of manufacturing artificial jewelry from the crystalline lenses of the eyes of sea animals comprising solidifying said lenses, then removing the white surface of the same, then treating the same with a solution of lead acetate, and then treating the same with hydrochlorid acid.

7. The process of manufacturing artificial jewelry from the crystalline lenses of the eyes of sea animals comprising solidifying said lenses, then removing the white surface of the same, then macerating the same in a saline solution containing coloring matter.

8. The process of manufacturing artificial jewelry from the crystalline lenses of the eyes of sea animals comprising solidifying said lenses by heating the same with moisture, then removing the white coating thereof, and coloring said lenses.

9. The process of manufacturing artificial jewelry from the crystalline lenses of the eyes of sea animals comprising solidifying the same, then removing the white surface thereof, then polishing the said lenses with a salt, and finally coloring said lenses.

10. The process of manufacturing artificial jewelry from the crystalline lenses of the eyes of sea animals, comprising macerating the same in a solution of a metallic compound, and then treating the same with a precipitant which will form an insoluble compound with the metallic compound to cause said lenses to lose their transparency and coloring said lenses.

11. The process of producing artificial jewelry from the transparent crystalline lenses of the eyes of fishes, comprising macerating the same in a solution of lead acetate and then treating the same with an acid which will form a precipitate with lead acetate, and then coloring the lenses.

In testimony that I claim the foregoing as my invention, I have signed my name in presence of two subscribing witnesses.

KOSAKU MURAKAMI.

Witnesses:
GENJI KURIBARA,
SHIGGO CALTOR.